(12) United States Patent
Ricci

(10) Patent No.: US 12,122,676 B2
(45) Date of Patent: Oct. 22, 2024

(54) CARBON NANOTUBE ACID PURIFICATION

(71) Applicant: Nano-C, Inc., Westwood, MA (US)

(72) Inventor: Melissa J. Ricci, Dedham, MA (US)

(73) Assignee: NANO-C, INC., Westwood, MA (US)

( * ) Notice: Subject to any disclaimer, the term of this patent is extended or adjusted under 35 U.S.C. 154(b) by 0 days.

(21) Appl. No.: 17/494,396

(22) Filed: Oct. 5, 2021

(65) Prior Publication Data

US 2022/0106191 A1    Apr. 7, 2022

Related U.S. Application Data

(60) Provisional application No. 63/088,355, filed on Oct. 6, 2020.

(51) Int. Cl.
| | |
|---|---|
| *C01B 32/174* | (2017.01) |
| *B82Y 40/00* | (2011.01) |
| *C01B 32/17* | (2017.01) |
| *C09D 11/037* | (2014.01) |

(52) U.S. Cl.
CPC ............ *C01B 32/174* (2017.08); *C01B 32/17* (2017.08); *C09D 11/037* (2013.01); *B82Y 40/00* (2013.01); *C01B 2202/06* (2013.01); *C01B 2202/22* (2013.01); *C01B 2202/30* (2013.01); *C01P 2004/133* (2013.01); *C01P 2004/64* (2013.01); *C01P 2006/40* (2013.01); *C01P 2006/80* (2013.01)

(58) Field of Classification Search
CPC ..... C01B 32/158; C01B 32/159; C01B 32/17; C01B 32/174; C01B 2202/02; C01B 2202/06; C01B 2202/30; B82Y 40/00; B82Y 30/00; C09D 11/037
See application file for complete search history.

(56) References Cited

U.S. PATENT DOCUMENTS

| | | | |
|---|---|---|---|
| 5,273,729 A | 12/1993 | Howard et al. | |
| 5,985,232 A | 11/1999 | Howard et al. | |
| 7,335,344 B2 | 2/2008 | Height et al. | |
| 7,396,520 B2 | 7/2008 | Howard et al. | |
| 7,435,403 B2 | 10/2008 | Kronholm et al. | |
| 7,771,692 B2 | 8/2010 | Howard et al. | |
| 7,887,775 B2 | 2/2011 | Height et al. | |
| 9,695,046 B2 * | 7/2017 | Hocke ................... | H01M 4/133 |
| 2010/0074832 A1 | 3/2010 | Dailly et al. | |

(Continued)

FOREIGN PATENT DOCUMENTS

| | | | |
|---|---|---|---|
| CN | 206089049 U | * | 4/2017 |
| JP | 2007176767 A | * | 7/2007 |
| WO | WO-2014176653 | | 11/2014 |

OTHER PUBLICATIONS

Ge, Cuicui, et al. "Quantitative analysis of metal impurities in carbon nanotubes: efficacy of different pretreatment protocols for ICPMS spectroscopy." Analytical chemistry 80.24 (2008): 9426-9434.*

(Continued)

*Primary Examiner* — Richard M Rump
(74) *Attorney, Agent, or Firm* — Wilmer Cutler Pickering; Hale and Dorr LLP

(57) ABSTRACT

Carbon nanotubes and dispersions containing carbon nanotubes are provided. Methods of processing carbon nanotubes and dispersions containing purified carbon nanotubes are provided.

18 Claims, 13 Drawing Sheets

(56) References Cited

U.S. PATENT DOCUMENTS

| | | | |
|---|---|---|---|
| 2010/0298125 A1* | 11/2010 | Kim | B01J 37/06 |
| | | | 502/185 |
| 2015/0108429 A1 | 4/2015 | Uppili | |
| 2015/0251910 A1* | 9/2015 | Lee | C01B 32/17 |
| | | | 977/845 |
| 2017/0294583 A1 | 10/2017 | Liang et al. | |

OTHER PUBLICATIONS

Cho, Seungchan, Keiko Kikuchi, and Akira Kawasaki. "On the role of amorphous intergranular and interfacial layers in the thermal conductivity of a multi-walled carbon nanotube-copper matrix composite." Acta Materialia 60.2 (2012): 726-736.*

English machine translation of JP2007176767A (2007).*

International Search Report and Written Opinion issued by the U.S. Patent and Trademark Office as International Searching Authority for International Application No. PCT/US2021/053319, dated Jan. 10, 2022 (12 pages).

* cited by examiner

CARBON NANOTUBE ACID PURIFICATION

This application claims the benefit of and priority to U.S. Provisional Patent Application No. 63/088,355, filed Oct. 6, 2020, the entire content of which is herein incorporated by reference.

FIELD

This application is directed to processing of carbon nanotubes. In particular, this application is directed to carbon nanotubes and methods of preparing carbon nanotubes having improved properties and compatibility for use in nanotube inks utilizing improved purification processes.

BACKGROUND

Nanotubes are members of the fullerene structural family, which also includes the spherical buckyballs, and the ends of a nanotube may be capped with a hemisphere of the buckyball structure. Their name is derived from their long, hollow structure with the walls formed by atomically thick sheets of carbon, called graphene. These sheets are rolled at specific and discrete ("chiral") angles, and the combination of the rolling angle and radius decides the nanotube properties; for example, whether the nanotube behaves as a metal or semiconductor. Nanotubes are categorized as single-walled carbon nanotubes (SWCNT) and multi-walled carbon nanotubes (MWCNT). While single-walled carbon nanotubes contain one single folded graphene sheet, multi-walled carbon nanotubes include multiple rolled layers (concentric tubes) of graphite.

Single-walled carbon nanotubes are characterized by their unique mechanical, electrical and optical properties. The tensile strength of individual single-walled carbon nanotubes can be well over 30 GPa and electrical conductance of metallic single-walled carbon nanotubes ropes approach $10^6$ S/m. Formed after deposition of single-walled carbon nanotube dispersions, single-walled carbon nanotube networks also allow visible and infrared light transmission in the direction normal to the plane of the film. This property arises from the extremely small diameters (<1.5 nm average) of the single-walled carbon nanotubes coupled with the huge aspect (i.e., length-to-diameter) ratio with typical values of 1000-1500. Thus, the formation of transparent conductive networks is possible. The combination of such properties in a single material marks them as distinctive candidates for a multitude of lab-demonstrated applications like field effect transistors, non-volatile memories, displays, touch screens, battery electrodes, supercapacitors and filtration membranes.

After their formation, such carbon nanotube dispersions can be either mixed with solutions of other materials, e.g., polymers of which electrical conductivity is intended to be increased or deposited on substrates using established coating techniques such as dip- and spray-coating or inkjet printing.

As produced raw carbon nanotube soots generally include material impurities (extraneous impurities), such as transition metal catalysts, graphitic carbons, amorphous carbon nanoparticles, fullerenes, carbon anions, polycyclic aromatic hydrocarbons along with the desired carbon nanotube products. The nature and degree of the electronic impurities in a given raw material can depend on the method of synthesis, such as, for example, laser, arc, High-Pressure Carbon Monoxide Conversion (HiPco), chemical vapor deposition (CVD), or combustion.

Known purification protocols generally involve steps of generic unit operations like pre-oxidation, acid reflux, mechanical mixing, ultrasonication, filtration, neutralization, and centrifugation. Selecting a suitable combination depends upon the method of production of the carbon nanotubes and the specific impurity targeted. Extraneous impurities, such as catalyst metal particles, fullerenic carbon, amorphous carbon, graphitic carbon, and carbon onions, are present to different degrees in as prepared raw carbon nanotube samples. Oxidative chemical treatments as part of the purification protocol and multiple acid treatments as part of the typical purification processes result in reasonably clean carbon nanotubes (<0.5 wt % relative to metal residue). However, an aggressive chemical purification can result in a loss of conductive pathways, which leads to a drastic fall in the single tube electrical conductance as well as the elimination of the inter-band optical transitions arising from the van Hove singularities. Accordingly, for many applications, especially applications requiring a combination of optical and electrical properties retaining the electronic structure of the carbon nanotubes substantially intact is an important aspect in the formation of single-walled carbon nanotube inks.

In accordance with certain purification procedures, carbon nanotubes are purified using a combination of sulfuric acid and nitric acid, which provides metals removal and oxidation in one step. This process can generate a high fluid content, highly debundled, stable "wet paste." Carbon nanotube practical advantages and theoretical performance boosts in applications are generally most greatly realized when the purified, debundled, carbon nanotube material is maintained in its debundled state throughout device/product/process application.

Unfortunately, the presence of sulfuric acid in the process can interfere with potential uses of the purified nanotubes. For example, the sulfuric acid poses an incompatibility with silver, as even trace amounts of sulfur are known to corrode/oxidize silver and render a silver or silver hybrid film unusable. It is therefore desirable to develop a new carbon nanotube purification process which minimizes the presence of sulfur.

SUMMARY

The present application is directed to a carbon nanotubes and carbon nanotube purification processes and the dispersions and ink precursor pastes obtainable from such improved purification process. In particular, the present application in one embodiment is directed to a carbon nanotube purification process that minimizes the reliance on sulfur containing acid and the dispersions and ink precursor pastes obtainable from such improved purification process. In accordance with certain aspects, the purification process described herein is particularly suitable for purification of carbon nanotubes for use in the preparation of inks and films containing silver.

In accordance with some embodiments, a method of processing carbon nanotubes is disclosed, wherein the method includes providing a carbon nanotube composition comprising carbon nanotubes and impurities, contacting the carbon nanotube composition with a pretreatment agent to provide a pretreated composition, drying the pretreated composition to a water content of less than 10%, optionally less than 5% or less than 1%, and subsequently contacting the pretreated composition with an oxidizing agent, and optionally, additional pretreatment agent, to provide a composition comprising oxidized carbon nanotubes.

In some embodiments, the carbon nanotubes comprise single-walled carbon nanotubes.

In some embodiments, the carbon nanotubes comprise multi-walled carbon nanotubes.

In some embodiments, the pretreatment agent is selected from the group consisting of phosphoric acid, methanesulfonic acid, ethanesulfonic acid, 1-propanesulfonic acid, dichloroacetic acid, ammonium sulfate, lithium sulfate, sodium sulfate, potassium sulfate, metal chloride salts particularly including lithium chloride, potassium chloride, sodium chloride, rubidium chloride, cesium chloride, iron chloride, aluminum chloride, copper chloride, nickel chloride, potassium phosphate and combinations thereof.

In some embodiments, the pretreatment agent comprises phosphoric acid.

In some embodiments, the phosphoric acid has a concentration of between about 0.01M and 10.9 M, optionally between about 3M and 9M.

In some embodiments, the oxidizing agent is selected from the group consisting of nitric acid, potassium permanganate, chromium trioxide, hydrogen peroxide, potassium chlorate, sodium nitrate, perchloric acid and combinations thereof.

In some embodiments, the oxidizing agent comprises nitric acid, optionally where the nitric acid concentration is between about 0.01M and 11.7M, or between about 0.3M and 3M.

In some embodiments, the carbon nanotube composition is contacted with the pretreatment agent at a weight ratio from about 10:1 to about 80:1 pretreatment agent to carbon nanotubes.

In some embodiments, the method further includes heating the composition comprising pretreated carbon nanotubes at a temperature from about 80° C. to 200° C.

In some embodiments, the method further includes heating the pretreated composition at a temperature from about 30° C. to about 170° C. prior to contacting with the oxidizing agent.

In some embodiments, the method further includes removing at least some of the impurities from the nanotube composition to provide purified carbon nanotubes.

In some embodiments, a method of processing carbon nanotubes is disclosed, wherein the method includes providing a carbon nanotube composition comprising carbon nanotubes and impurities, contacting the carbon nanotube composition with an acid composition, wherein the acid composition comprises phosphoric acid and nitric acid, thereby causing an increase in the separation distance between the carbon nanotubes.

In some embodiments, a method of processing carbon nanotubes is disclosed, wherein the method includes providing a carbon nanotube composition comprising carbon nanotubes and impurities, contacting the carbon nanotube composition with a pretreatment agent to provide a pretreated composition, and subsequently contacting the pretreated composition with an exfoliating fluid.

In some embodiments, the pretreatment agent is selected from the group consisting of phosphoric acid, methanesulfonic acid, ethanesulfonic acid, 1-propanesulfonic acid, dichloroacetic acid, ammonium sulfate, lithium sulfate, sodium sulfate, potassium sulfate, metal chloride salts particularly including lithium chloride, potassium chloride, sodium chloride, rubidium chloride, cesium chloride, iron chloride, aluminum chloride, copper chloride, nickel chloride, potassium phosphate and combinations thereof.

In some embodiments, the exfoliating fluid is selected from the group consisting of water, dimethylformamide, dimethylacetamide, n-methyl pyrrolidone, dimethyl sulfoxide, acetonitrile, tetrahydrofuran, cyclohexanol, butanol, ethanol, methanol, isopropanol, ethylene glycol, propylene glycol, propylene glycol methyl ether, cyrene, methyl lactate, glycerin, and mixtures thereof.

In some embodiments, the impurities are selected from the group consisting of transition metal catalysts, graphitic carbons, amorphous carbon nanoparticles, fullerenes, carbon anions, polycyclic aromatic hydrocarbons, and mixtures thereof.

In some embodiments, the present application discloses carbon nanotubes produced in accordance with any of the methods described herein, optionally wherein the carbon nanotubes contain less than 3% sulfur.

In some embodiments, the carbon nanotubes contain less than 10% metal impurities, or contain less than 4% metal impurities.

In some embodiments, a stable carbon nanotube dispersion is disclosed, wherein the dispersion includes carbon nanotubes as described herein dispersed in a solvent selected from the group consisting of water, tetrahydrofuran, propylene glycol methyl ether, acetonitrile, dimethylformamide, n-methyl pyrrolidone, dimethylacetamide, dimethylsulfoxide, cyrene, mixed alcohol, hexane, isopropanol, methanol, ethanol, butanol, benzene, toluene, xylenes, chlorobenzene, dichlorobenzene, cyclohexanol, ethylene glycol, propylene glycol, methyl lactate, or mixtures thereof.

In some embodiments, the stable carbon nanotube dispersion has a carbon nanotube content of greater than 0.01 absorbance units at 550 nm.

In some embodiments, the pretreatment agent comprises phosphoric acid and the oxidizing agent comprises nitric acid.

In some embodiments, a method of processing carbon nanotubes is disclosed, wherein the method includes providing a carbon nanotube composition comprising carbon nanotubes and impurities, contacting the carbon nanotube composition with a combination of phosphoric acid and nitric acid to provide a composition comprising oxidized carbon nanotubes.

In some embodiments, the method further includes combining the composition comprising oxidized carbon nanotubes with a silver ink.

BRIEF DESCRIPTION OF THE DRAWINGS

For a more complete understanding of various embodiments of the present invention, reference is now made to the following detailed description, taken in conjunction with the accompanying drawings, in which like reference characters refer to like parts throughout, and in which.

DETAILED DESCRIPTION OF THE INVENTION

Figure 1:
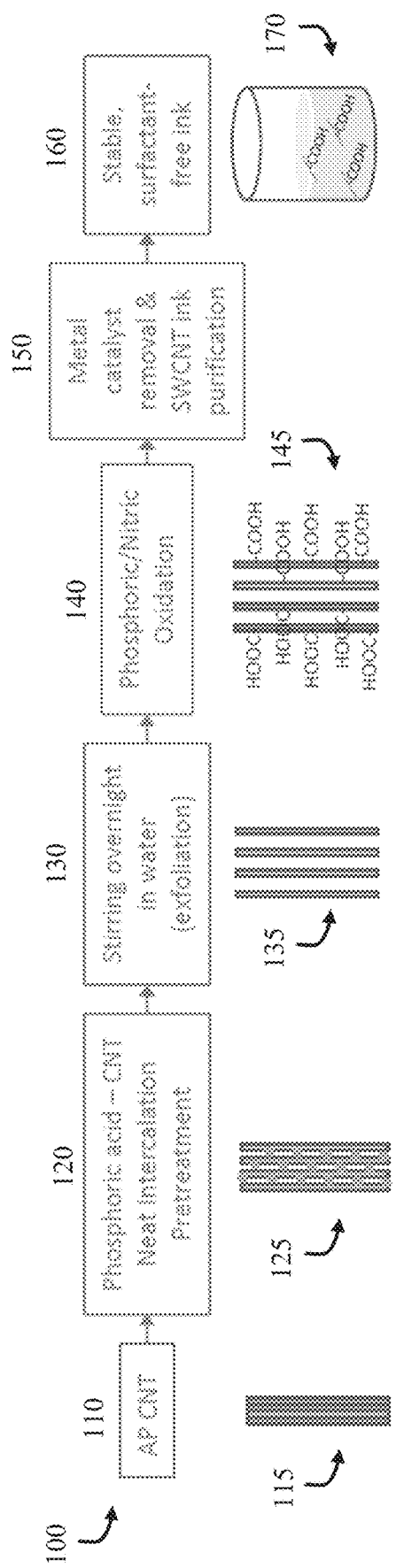
FIG. 1 is a process flow chart showing a method for purification of carbon nanotubes in accordance with some embodiments of the present invention.

The processing and purification of carbon nanotubes are described. Dispersions and ink precursor pastes of the disclosed nanotubes are also described, as well as methods for preparing such compositions.

It should be noted that as produced carbon nanotube raw material, purified carbon nanotube materials, fullerenes, and/or any other fullerenic materials can be synthesized and/or processed by the approaches described, for example, in Howard et al., U.S. Pat. No. 5,273,729, filed May 24, 1991, Howard et al., U.S. Pat. No. 5,985,232, filed Sep. 11, 1996, Height et al., U.S. Pat. Nos. 7,335,344 and 7,887,775 B2, filed Mar. 14, 2003, Kronholm et al. U.S. Pat. No. 7,435,403, filed Jul. 3, 2003, and Howard et al., U.S. Pat. Nos. 7,396,520 and 7,771,692 filed Jan. 21, 2005, which are hereby incorporated by reference herein in their entireties.

In some embodiments, the carbon nanotubes are single-walled carbon nanotubes. In other embodiments, the carbon nanotubes are multi-walled carbon nanotubes. For example, in some non-limiting embodiments, the nanotubes have at least two walls (i.e., double-walled). In other embodiments, the nanotubes have 3 to 12 walls. In further embodiments, the nanotubes have less than 12 walls. In yet another embodiment, the nanotubes have between 2 and 6 walls. In some embodiments, the carbon nanotubes have between 2 and 8 walls. In further embodiments, the carbon nanotubes have between 2 and 10 walls. In exemplary non-limiting embodiments, the carbon nanotubes have 2, 4, 6, 8, 10 or 12 walls.

In another embodiment, mixtures of single and multi-walled carbon nanotubes are provided. For example, in some embodiments, a mixture of single and double walled nanotubes is provided. In further embodiments, a mixture of single nanotubes and multi-walled nanotubes is provided. In another embodiment, a mixture of multi-walled carbon nanotubes is provided, in which the mixture includes nanotubes having various walled configurations.

In some embodiments, the carbon nanotube starting material is at least about 30% pure, at least about 40% pure, at least about 50% pure, at least about 60% pure, at least about 70% pure, at least about 80% pure, at least about 85% pure, or at least about 95% pure. In other embodiments, the carbon nanotubes are about 50% to about 80% pure. The purified carbon nanotubes after processing in accordance with certain embodiments of the present application typically are about 90 to 99% pure. Examples of impurities include, but are not limited to, metals, metal oxides and carbonaceous materials including amorphous carbon. Purity of the carbon nanotube composition, particularly relative to metals and metal oxides, can be determined by, for example, thermogravimetric analysis under air. More detailed purity data can be obtained using X-ray photoelectron spectroscopy (XPS), X-ray diffraction (XRD) using internal standards or elemental analysis. The quantitative assessment of carbonaceous impurities is difficult, but UV-vis and Raman spectroscopy can provide valuable information.

As used herein, the term "metal catalyst particles" refer to metal particles generated by catalytic synthesis methods for generating carbon materials. Metal catalyst particles typically comprise transition metals and mixtures thereof including, but not limited to, nickel, molybdenum, palladium, yttrium, iron, copper, and cobalt. In accordance with some embodiments, the starting metal residue (metal catalyst particles and other metal contaminants) may be greater than 20% and, in some cases, greater than 40%. In some embodiments, the post-treatment metal residue is less than 10% and, in some cases, less than 4% metal residue.

"Purification" refers to a process whereby the percentage (or fraction) of a desired material in a sample is increased via processing while undesirable materials such as impurities are decreased. Purification methods of the present application may increase the percentage by mass, percentage by weight, percentage by volume and/or mole fraction of one or more selected carbon nanotubes in a sample undergoing processing. Purification methods of the present invention useful for some applications are capable of providing purified carbon nanotubes having a structure and composition that does not vary significantly from its structure and composition in the starting material subject to processing or has a structure that is enhanced after processing via the present methods, such as a structure exhibiting an enhanced extent of crystallinity. For example, methods of the present application are capable of purifying a single-walled carbon nanotube-containing sample such that the purified single-walled carbon nanotubes are free of or contain limited quantities of impurities such as heavily bundled carbon nanotubes, unstable sediment, overoxidized carbon nanotubes, and nontubular carbon. The purified carbon nanotubes are suitable for use as precursor materials to produce stable carbon nanotube inks.

"Sulfur-free" means that the composition contains less than 3% by weight, based on the total amount of the composition, more particularly less than 0.5% by weight and in certain cases no detectable sulfur; the sulfur being elemental, or in the form of sulfur-containing species.

In accordance with one aspect, the present application describes a carbon nanotube purification process that provides for separation of carbon nanotubes while minimizing (or in some embodiments eliminating) the presence of sulfur in the purified nanotube composition. FIG. 1 is a process flow chart 100 showing an exemplary method for separating carbon nanotubes.

In accordance with the exemplary process shown, as-produced carbon nanotubes (AP CNT) can be provided, as shown in step 110. The as-produced carbon nanotubes are typically highly bundled and typically contain metal catalyst and other, mainly carbonaceous, impurities. As shown in step 120, the as-produced carbon nanotubes can be optionally pretreated by contacting the as-produced carbon nanotubes with a pretreatment agent, such as phosphoric acid, to introduce molecules in between bundles of carbon nanotubes to provide separation between the nanotubes. As shown in step 130, the carbon nanotube composition may further be optionally combined with an exfoliating fluid (e.g., water) and stirred or mixed for a period of time, such as overnight. Without wishing to be bound by theory, stirring or mixing in step 130 may allow the exfoliating fluid molecules to penetrate the nanotube bundles to facilitate separation of the nanotubes from one another. As shown in step 140, the carbon nanotube composition may be subjected to oxidation treatment 140 by contacting the carbon nanotube composition with an oxidizing agent composition, wherein the oxidizing agent composition comprises phosphoric acid and nitric acid in the embodiment shown. Without wishing to be bound by theory, the oxidation treatment may interpenetrate the nanotube bundles and may functionalize the carbon nanotube surface with oxygen-containing functional groups, such as carboxylic acids. In certain embodiments, the combination of phosphoric acid and nitric acid may facilitate metal removal and purification of the carbon nanotubes. As shown in step 150, metal catalyst removal and purification can be carried out by filtration or the like to prepare a suitable precursor material to produce stable carbon nanotube ink 160.

Nanotubes that can be purified in accordance with the process disclosed herein include those commercially available and produced by any conventional methods used in the art. Furthermore, the described process may be utilized to purify any carbon containing materials of similar structure containing impurities. As produced carbon nanotubes 115 are typically highly bundled and contain metal catalyst impurities and other impurities. The pretreatment 120 of carbon nanotubes can result in formation of a carbon nanotube network 125 intercalated with the pretreatment agent. Examples of suitable pretreatment agents include, but are not limited to, phosphoric acid, methanesulfonic acid, ethanesulfonic acid, 1-propanesulfonic acid, dichloroacetic acid, ammonium sulfate, lithium sulfate, sodium sulfate, potassium sulfate, metal chloride salts particularly including lithium chloride, potassium chloride, sodium chloride, rubidium chloride, cesium chloride, iron chloride, aluminum chloride, copper chloride, nickel chloride, and potassium phosphate. In accordance with certain embodiments, the pretreatment agent is an acid, such as phosphoric acid. Mixtures of pretreatment agents may also be used for the pretreatment. In accordance with certain embodiments, pretreatment agents may be used in amounts from about 0.5:1 to 1000:1, more particularly from about 2:1 to 200:1 pretreatment agent to carbon nanotube weight ratio. In accordance with some embodiments, the carbon nanotubes may be contacted in an amount from about 5:1 to about 200:1, more particularly from about 8:1 to about 75:1 and in certain cases from about 10:1 to about 80:1 pretreatment agent to carbon nanotube weight ratio. In accordance with certain aspects, the pretreatment agent comprises phosphoric acid, at a concentration of between about 0.01M and 10.9 M, optionally between about 3M and 9M.

After the initial mixing of the as-produced carbon nanotubes with the pretreatment agent, the pretreated composition may be heated, optionally under vacuum, at a temperature from about 30° C. to about 200° C., more particularly from about 80° C. to about 150° C. In accordance with some embodiments, the resulting pretreated composition, typically in the form of a paste, may be processed from about 1 hour to about 24 hours, to more prolonged undefined storage time, provided the temperature of the paste is kept above around 100 to about 130° C., or if not at elevated temperature, stored under inert atmosphere.

In accordance with particularly useful aspects, after contacting the carbon nanotubes with the pretreatment agent to form a carbon nanotube-pretreatment agent mixed paste, the mixed paste is dried before subjecting to the oxidation step. In accordance with some aspects, the carbon nanotube-pretreatment agent mixed paste is maintained in a dry condition for a period of time before oxidizing. In accordance with some embodiments, the carbon nanotube-pretreatment agent mixed paste is dried to a moisture content of no more than about 1, 5, or 10% by weight as determined by thermogravimetric analysis (TGA). For lower water concentrations Karl Fisher titration can be used for improved precision. In some cases, the carbon nanotube-pretreatment agent mixed paste does not contain any detectable moisture.

The carbon nanotube-pretreatment agent mixed paste may be maintained under prolonged heating for an extended period of time prior to the subsequent oxidative acid processing step. In accordance with some aspects, this dry state may be achieved through prolonged thermal heating. In accordance with particularly useful aspects, the carbon nanotube-pretreatment agent mixed paste is processed under conditions that reduce or minimize water content. In accordance with some aspects, the carbon nanotubes and pretreatment agent can be mixed, with one or both having some water present, and the carbon nanotube-pretreatment agent mixed paste can then be thermally treated to remove the water prior to further processing. In accordance with some aspects, the drying step may be for a period of several hours (e.g., 2 to 12 hours) to several days (e.g., 2 to 14 days), or even longer. In accordance with some aspects, the drying step may entail prolonged storage time in the mixed but dry state prior to initiating the next step of acid purification treatment. In accordance with some aspects, the presence of water can interfere with the efficient intercalation of the pretreatment agent in the carbon nanotube network.

Although not wishing to be bound by theory, it is believed that the following explains the benefits associated with minimizing or eliminating water to provide more efficient intercalation. Upon mixing of the carbon nanotubes and pretreatment agent, with one or both having at least trace water present, prolonged thermal treatment is commenced, during which time the water present evaporates. As the water is completely or near-completely evaporated and the heating allowed to continue, any intermolecular forces (such as hydrogen bonds) between molecules of the pretreatment agent will be overcome by such prolonged heating. The breaking of the hydrogen bonded network (for example) will induce a high-energy condition where it will become thermodynamically favorable for the resulting pretreatment species to intercalate between the carbon nanotube bundle layers to minimize energy. In addition, the absence of water will eliminate the risk of water acting as "bridge", based on its hydrogen bond donor and acceptor properties, between molecules of the pretreatment agent, which would reduce the efficiency of the intercalation process. This intercalation process will progress gradually, starting with the outer carbon nanotubes, carbon nanotube bundles and carbonaceous impurity layers, and gradually working towards the inner carbonaceous layers during the prolonged heating time, the intercalation will progress with continued heating until energy is minimized. It is believed that the more completely and the more evenly the pretreatment agent has permeated and intercalated the carbon nanotubes, carbon nanotube bundles, and carbonaceous impurity layers, the more effective the subsequent oxidative treatment will be.

Figure 2:
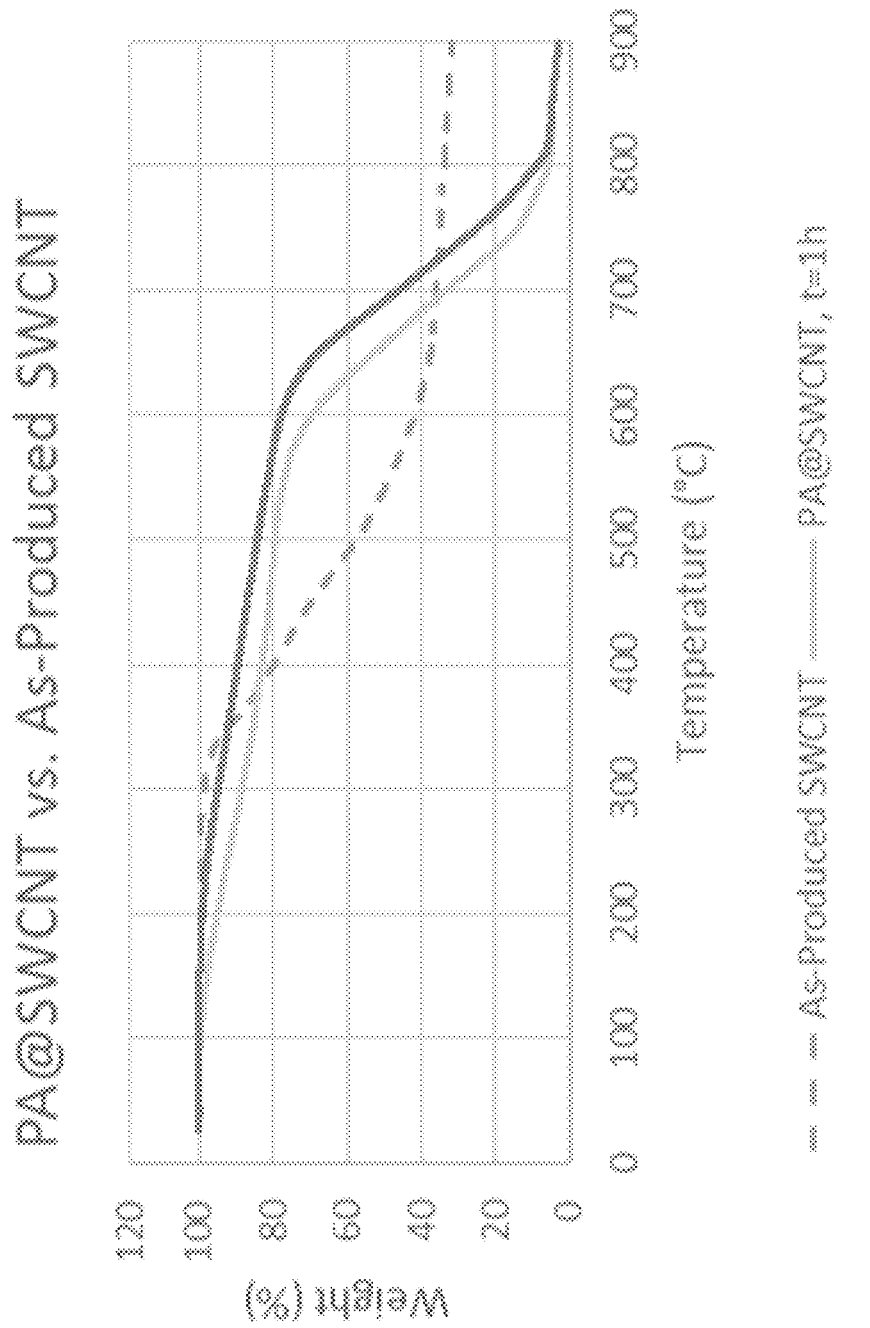
FIG. 2 is a thermogravimetric analysis (TGA) graph comparing as-produced single-walled carbon nanotubes to an intercalated paste of single-walled carbon nanotubes combined with phosphoric acid.
Figure 3:
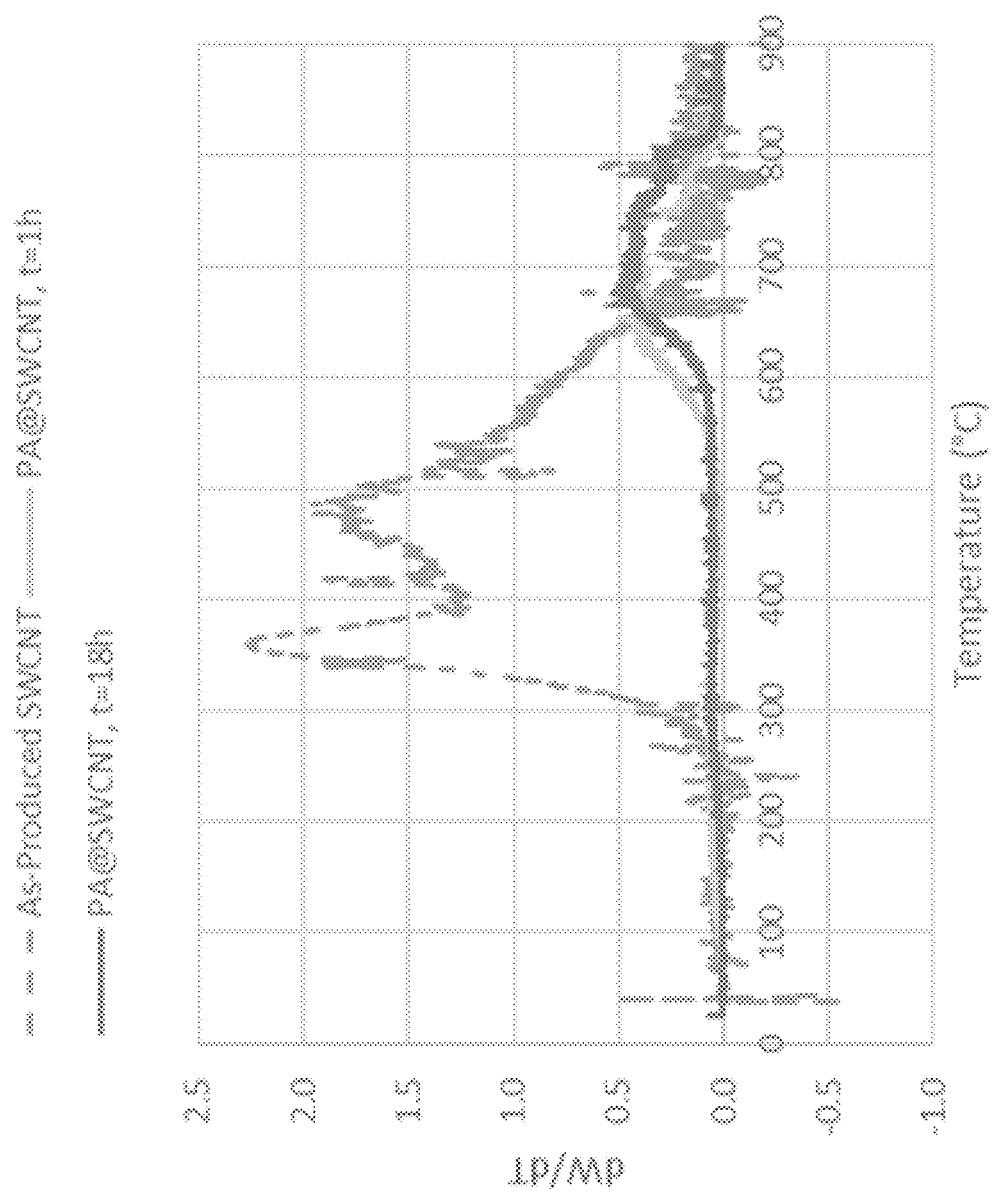
FIG. 3 is a thermal graph showing rate of weight change comparing as-produced single-walled carbon nanotubes to an intercalated paste of single-walled carbon nanotubes combined with phosphoric acid.

The progress and the effect of the intercalation process of the pretreatment agent through the carbon nanotube host material upon prolonged heating is evidenced in the thermogravimetric analysis (TGA) curves shown in FIG. 2 and FIG. 3. It is known among those skilled in the art that certain sample mixtures composed of both carbonaceous impurities and more pristine carbon nanotubes will exhibit a thermal profile where the presence of carbonaceous impurities shifts the entire thermally-induced decomposition toward lower temperature. Accordingly, the carbonaceous impurities and pristine carbon nanotubes do not thermally decompose separately. As shown in FIG. 2, the carbon nanotube starting material (without any pretreatment agent present), exhibits the main thermal event starting at around 300° C.—far below the thermally-induced decomposition temperature of pristine carbon nanotubes—with thermal decomposition of all carbonaceous species close to complete decomposition at around 600° C. The carbon nanotube starting material rate of thermal decomposition (FIG. 3) consists of a broad peak of relatively high rate, that starts at around 300° C., and ends at around 700° C. In contrast, in the pretreated sample (where the pretreatment agent is phosphoric acid), where it is believed that the pretreatment agent is effectively spreading itself between the carbon nanotubes, carbon nanotube bundle layers and carbonaceous impurity layers, the thermal decomposition profile shows the separated lower-temperature decomposition of carbonaceous impurities followed by the decomposition of the pristine of carbon nanotubes at higher temperatures. In the pretreated sample heat-treated for 1 hour (light gray solid curve), carbonaceous impurities are thermally decomposed separately and gradually, at around 300° C., while the more pristine carbon nanotube species are thermally decomposed in a separate thermal event at much higher temperature, starting at around 550° C. (most easily evidenced in FIG. 3). The same intercalated sample heated with yet more prolonged heating is sampled again after 18 hours (dark solid curve), where it is found, when subject to the same thermal decomposition conditions, that the thermal event corresponding to carbon nanotubes is shifted out to still higher temperature, with the thermal decomposition starting at around 600° C. The effect of drying in the thermal profile is evidenced by the shift from onset of thermal decomposition occurring around 550° C. for the 1 hour sample, to around 600° C., for the 18 hour intercalated sample. The most effective pretreatment process will thus comprise carbon nanotubes and the pretreatment agent. All water, or as much water as possible, will be driven off during the heat treatment step described, and prolonged heating will be continued such that the pretreatment agent will be most thoroughly intercalated between the carbon nanotube, carbon nanotube bundles, and carbonaceous impurity layers, to most effectively prepare the pretreated species for the subsequent oxidative purification treatment. The resulting pretreated composition contains a carbon nanotube network 125 in which the carbon nanotubes have been intercalated by the pretreatment agent.

The carbon nanotube composition, optionally after being subjected to the pretreatment agent, can then be combined with an exfoliating fluid such as water or another solvent to disperse the carbon nanotubes in the carbon nanotube composition and liquid mixture. A particularly useful exfoliating fluid is one that is miscible with the pretreatment agent, and ideally, that will also wet the carbon nanotubes. Other particularly useful exfoliating fluids include, but are not limited to, dimethylformamide, dimethylacetamide, dimethyl sulfoxide, acetonitrile, tetrahydrofuran, cyclohexanol, butanol, ethanol, methanol, isopropanol, ethylene glycol, propylene glycol, and glycerin. The carbon nanotube composition may be contacted with the exfoliating fluid in an amount from about 25:1 to about 250:1 exfoliating fluid: carbon nanotube weight ratio. In accordance with some embodiments, the carbon nanotube composition and exfoliating fluid mixture can be stirred for a period of time sufficient to allow the solvent molecules to penetrate the nanotube bundles and facilitate separation of the nanotubes from one another. In accordance with certain embodiments, the carbon nanotube composition in the exfoliating fluid can be stirred for at least 1 min to about 72 hours. Typically, the carbon nanotube composition and exfoliating fluid mixture may be stirred overnight. The resulting carbon nanotube composition in the exfoliating fluid contains dispersed carbon nanotubes.

The carbon nanotube composition may be maintained under prolonged heating for an extended period of time prior to stirring in the exfoliating fluid, which is followed by the oxidative acid processing step. In accordance with some aspects, this dry state may be achieved through prolonged thermal heating. In accordance with particularly useful aspects, the carbon nanotube composition is processed under conditions that reduce or minimize water content prior to exposure to the exfoliating fluid. In accordance with some aspects, the drying step may be for a period of several hours (e.g., 2 to 12 hours) to several days (e.g., 2 to 14 days), or even longer. In accordance with some aspects, the drying step may entail prolonged storage time in the mixed but dry state prior to initiating the next step of acid purification treatment.

The carbon nanotubes can be subjected to an oxidation treatment by contacting the pretreated composition or exfoliated composition with an oxidizing agent, such as an oxidizing acid composition. Examples of oxidizing agents include, but are not limited to, nitric acid, potassium permanganate, chromium trioxide, hydrogen peroxide, potassium chlorate, sodium nitrate, perchloric acid and combinations thereof. The carbon nanotube composition may be contacted with the oxidizing agent composition in a concentration of 0.01M, 0.3M, 0.7M. 1M, 11.7M or in between these values. for about 1 hour to 12 hours or more, subject to initial concentration of oxidizing agents and reaction temperature. In accordance with certain embodiments, the oxidizing acid may be nitric acid. Nitric acid, when used as the oxidizing agent, may have a concentration of between about 0.01M and 11.7M or, in some cases, between about 0.3M and 3M. Exact process conditions, also depending on the characteristics of the starting material used, can be optimized based on TGA purification results and/or resulting transparent conductive film resistance and transmission performance. The mixture can be stirred or otherwise mixed for a period of time sufficient to oxidize the carbon nanotubes to generate oxygen-bearing functional groups on the carbon nanotube surface.

In some embodiments, the oxidizing agent may be used in conjunction with additional pretreatment agent. For example, a combination of phosphoric acid and an oxidizing acid may be used. In accordance with certain embodiments, where phosphoric acid is used as a pretreatment agent, and also in the event additional pretreatment agent is added with an oxidizing agent, the phosphoric acid may have a concentration of between about 1.5M to about 10M, or, in some cases, between about 3M to 9M, with a typical concentration being 6-7M. In accordance with some embodiments, phosphoric acid and nitric acid may be used in combination. The phosphoric acid or other pretreatment agent may facilitate interpenetration of carbon nanotube bundles and delivery of the oxidizing agent to the interior of the bundle, which results in more homogeneously oxidizing the carbon nanotube surfaces. Oxidation in combination with a pretreatment agent, such as phosphoric acid, creates a purified carbon nanotube product with lower percentage of nontubular carbon impurities. The phosphoric acid or other pretreatment agent may also react with the oxidizing acid to form a more powerful oxidizing agent than the oxidizing acid alone to generate oxygen-containing functional groups, such as carboxylic acid functionality, on the carbon nanotube surface. In accordance with certain embodiments, the resulting composition is stirred at a temperature from about 80° C. to about 200° C. for at least 1 hour or until about 24 hours. The oxidation condition is anywhere between a mild heating to a vigorous reflux, though the actual internal reaction temperature is not known. In accordance with some embodiments, the composition is refluxed. The resulting composition comprises debundled carbon nanotubes with oxygen-containing functional groups on the carbon nanotube surface 145. Other oxidizing agents include, but are not limited to, potassium permanganate, chromium trioxide, hydrogen peroxide, potassium chlorate, sodium nitrate, perchloric acid and combinations thereof.

The carbon nanotube composition may be subjected to the oxidation treatment directly without any pretreatment or indirectly by being submitted to one or more pretreatment processes. For example, in certain embodiments, the as-produced carbon nanotube composition (AP CNT) 110 may be pretreated 120 by contacting the as-produced carbon nanotube with a pretreatment agent and then subjected to oxidation treatment 140 by contacting the carbon nanotube composition with an oxidizing agent. In accordance with other embodiments, the as-produced carbon nanotube composition 110 may be combined with water (or other exfoliating fluid) and stirred or mixed for a period of time 130 and then subjected to oxidation treatment 140 by contacting the carbon nanotube composition with an oxidizing agent. In accordance with yet other embodiments, the as-produced carbon nanotube composition 110 may be pretreated 120 by contacting the as-produced carbon nanotube composition with a pretreatment agent and then combined with water (or other exfoliating fluid) and stirred or mixed for a period of time, rinsed/extracted with water if using solvent, 130 and then subjected to oxidation treatment 140 by contacting the carbon nanotube composition with an oxidizing agent.

The composition after oxidation treatment can be further treated 150 to remove metal catalyst and other impurities through various processes, such as filtration, bath sonication, probe sonication, and centrifugation. The resulting precursor ink composition can be suitable for producing purified stable carbon nanotube inks 170, which provide benefits over inks prepared utilizing conventional purification methods.

The disclosed process allows carbon nanotube fluid dispersions at a high purity level carbon nanotube content and reduced sulfur content. For example, the disclosed process is capable of producing a stable, pre-debundled wet paste, which can be incorporated at significantly greater carbon nanotube content than reported previously to form slurries and mixed pastes, as well as high concentration stable inks. Carbon nanotubes purified through the process disclosed herein can be incorporated with water, aqueous/mixed solvent systems, and purely organic systems, but also allow other possibilities including high viscosity solvents, monomers, and polymers, where dispersion stability can be aided and promoted through a high viscosity vehicle, rather than be solely dictated by solubility parameters/surface tension. For example, a purified carbon nanotube wet paste in accordance with certain aspects of the present invention can be readily suspended in the high-viscosity solvent cyclohexanol to produce an ink. By contrast, purified material from other purification processes can result in inhomogeneous chunks/large unstable agglomeration as well as trace sulfur, with sulfur being present among sulfur-containing species such as sulfate, sulfate, organosulfur species, and the like.

Incorporating carbon nanotubes with metal nanowires (to make a "hybrid" material) offers several advantages over the neat metal, including, but not limited to, increased power handling, reduced roughness, and improved environmental stability (preliminary internal data). One benefit associated with certain embodiments wherein the process is sulfur-free is that the purified carbon nanotubes can be used in the preparation of a one-pot silver hybrid. In this process, a high concentration neat carbon nanotube ink or slurry is first made in a solvent that is compatible with the silver nanowire ink. The neat carbon nanotube ink and silver inks are then intimately mixed together by vortex, hand mixing, stirring, or via a planetary centrifugal speed mixer to combine. In many cases, the resulting "hybrid ink" is stable in that the mixed ink is only minimally agglomerated and produces a hybrid film via rod coating, dip coating, slot die coating, spray coating, gravure coating and similar. The sulfuric acid used in some conventional purification processes poses an incompatibility with silver, as even trace amounts of sulfur, or sulfur-containing molecules are known to corrode/oxidize silver and over time, render a silver or silver hybrid film unusable. By contrast, certain embodiments of the present application provide purified carbon nanotubes capable of being incorporated as water-based inks into a one-pot system with silver nanowires. Furthermore, carbon nanotubes purified through the disclosed process can also allow other possibilities including high viscosity solvents and monomers, where dispersion stability can be aided and promoted through high viscosity vehicle, rather than be solely dictated by solubility parameters/surface tension.

While sprayable and rod-coatable inks are useful in many processes to apply the hybrid inks, screen printing is another process application that is common. Screen-printable inks have large morphological differences vs. rod-coatable and sprayable inks, most notably in viscosity, where high viscosity solvents such as cyclohexanol are commonly utilized. In accordance with some aspects, the purified carbon nanotubes form a stable dispersion in cyclohexanol at a concentration of between an optical density of around 1 to around 20 between around 4° C. to around 35° C. As used herein, "stable" means that the dispersion can be coated neat or in a single pot with silver with only minimal negative impact to the film properties as a result of the hybrid or neat film, while improving film performance properties. For example, in a thermal heater tested side-by-side with screen-printed neat silver ink and screen-printed hybrid ink, while the hybrid ink sample did reduce the transparency, the reduction was similar as an analogous neat carbon nanotube film and power handling was increased by 25% vs. the neat silver control. If the hybrid one-pot ink is significantly unstable, the coated film properties will suffer loss of transparency and haze increase compared to an analogous neat carbon nanotube parent film and minimal to no performance boost vs. the analogous control neat silver film.

Carbon nanotubes produced in accordance with some embodiments of the present application are capable of forming stable dispersions in various solvents, including, but not limited to, water, tetrahydrofuran, propylene glycol methyl ether, acetonitrile, dimethylformamide, n-methyl pyrrolidone, dimethylacetamide, dimethylsulfoxide, cyrene, mixed alcohol, hexane, isopropanol, methanol, ethanol, butanol, benzene, toluene, xylenes, chlorobenzene, dichlorobenzene, cyclohexanol, ethylene glycol, propylene glycol, methyl lactate, and mixtures thereof. In accordance with certain embodiments, the process disclosed herein can provide stable carbon nanotube dispersions, wherein the carbon nanotube content, as determined by optical density at 550 nm, is between around 0.01 absorbance units to around 20 absorbance units, more particularly between about 0.1 absorbance units to around 15 absorbance units. In a typical optical density measurement, the high concentration ink dispersion is diluted 10:1 or similarly to allow measurement in the working range of the UV-Vis or UV-Vis monochrometer, typically between about 0.1 and about 2 absorbance units. Depending on the desired ink coating method and substrate, the final ink concentration optical density should be approximately 0.1-5 absorbance units for ultrasonic spray-coatable inks, and optical density between around 5 to around 20 absorbance units for slot-die or rod-coatable inks. Through mass balance methods, it was determined for one of the carbon nanotube ink compositions that carbon nanotube concentration was 315 mg/L at an optical density of 14 absorbance units.

EXAMPLES

A quantity of 4 g as-produced single-wall carbon nanotube composition (Carbon Solutions, 65% purity) was combined with 100 mL pretreatment agent, 85% phosphoric acid, in a crystallizing dish. The contents were stirred with a glass rod to form a thick, homogenous paste which was spread in a uniform layer at the bottom of the dish. The crystallizing dish was suspended in an oil bath which was heated between about 120 and 140° C. during an approximately 24 hour period, during which time a pretreated composition in the form of a neat phosphoric acid/single-wall carbon nanotube paste is formed upon driving off remaining water. FIG. 2 and FIG. 3 show the TGA thermal decomposition profiles for the phosphoric acid/single-wall carbon nanotube composition paste at various times compared to the as-produced SWCNT. As-produced single-wall carbon nanotube (dashed line) oxidation onset is around 300° C., with end of carbon nanotube oxidation temperature around 600° C. While it is difficult to obtain a known, 100% pure single-wall carbon nanotube composition sample, pure single-wall carbon nanotubes oxidation onset is known to occur around 600° C. or higher. The implication of the lower-than-expected overall oxidation temperature is that impurities in the as-produced single-wall carbon nanotube sample shift the oxidation of the entire sample towards lower temperature, as the lower-order carbon nanotube impurities "nontubular carbon" present throughout the sample accelerate the decomposition of the entire carbon nanotube sample, causing overall lower temperature oxidation than would occur otherwise, were the impurities not present. In contrast, the thermal profile of the two intercalated samples shows very different thermal behavior. In both intercalated samples, the main oxidation thermal event does not occur until around 600° C., synonymous with pure carbon nanotubes. Lower-burning impurities gradually oxidize in isolated fashion, evidenced by the steady decline in weight between around 200 and 600° C. This data supports the idea that the phosphoric acid is intercalating the carbon nanotube bundles and carbonaceous layers, as the phosphoric acid that is intercalated between the layers isolates the various impure carbon species, allowing each to oxidize separately. Further evidence is shown in the intercalation progress vs. time is where the shift toward even higher oxidation onset temperature between 1 hour and 18 hours intercalation time is notable.

Figure 4:
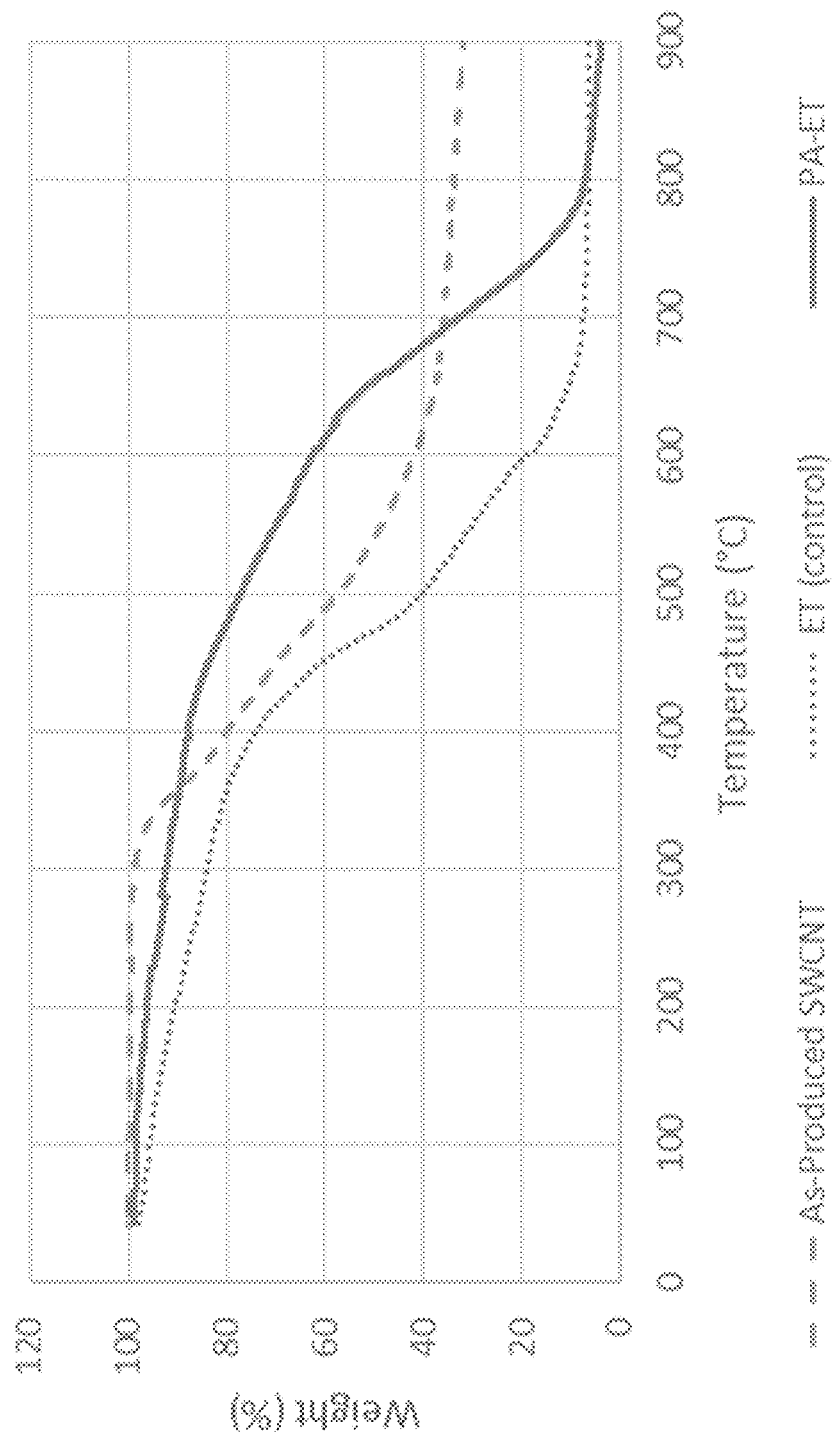
FIG. 4 is a thermogravimetric analysis (TGA) graph comparing ink precursor pastes produced using phosphoric acid in accordance with one aspect of the invention with a control paste.
Figure 5:
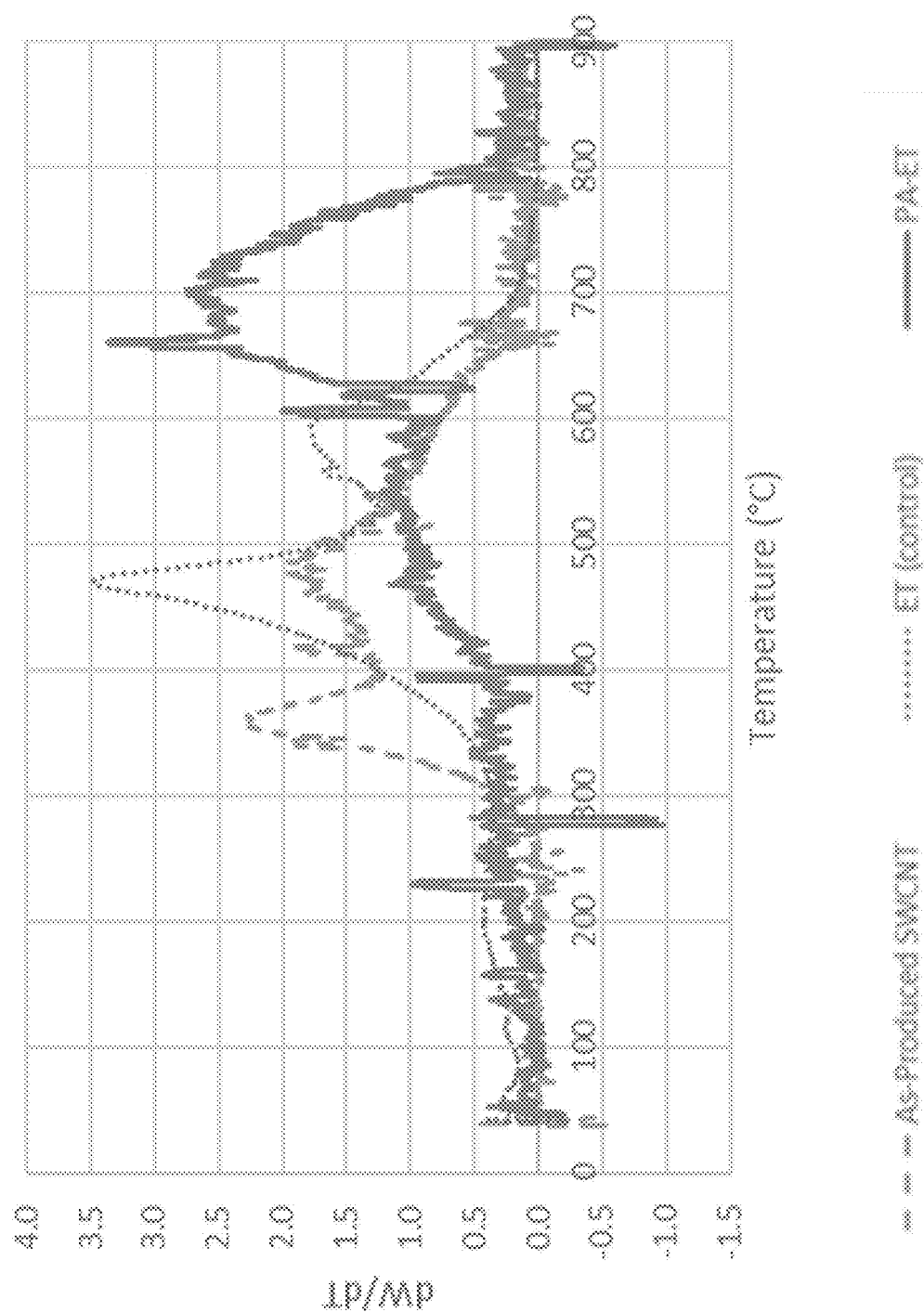
FIG. 5 is a thermal graph showing rate of weight change comparing ink precursor pastes produced using phosphoric acid in accordance with one aspect of the invention with a control paste.

FIG. 4 and FIG. 5 are thermogravimetric analysis (TGA) graphs comparing ink precursor pastes produced using phosphoric acid as a pretreatment agent followed by a blend of phosphoric acid and nitric acid for the oxidation treatment (PA-ET Process), compared to a control paste (ET process). The PA-ET paste was produced by subjecting the entire volume of phosphoric acid intercalated paste produced above to a 5 minute exfoliation in 125 mL DI water, after which time, 125 mL additional DI water, 135 mL additional 85% phosphoric acid and 65 mL 6N nitric acid was added and the mixture was refluxed in a flat bottom flask on a bare hotplate for 12 hours with hotplate setpoint at 425° C. The reaction mixture was allowed to cool to room temperature, and the resulting slurry was rinsed to pH neutral and probe sonicated. The residual paste was dried and analyzed by TGA. The control paste was produced by refluxing the as-produced carbon nanotubes with a blend of sulfuric acid and nitric acid for the oxidation treatment (ET Process). The temperature at peak oxidation rate is increased significantly, from about 450° C. for the control paste to about 700° C. for the paste in accordance with this example of one aspect of the present application, indicating a higher degree of purity in the PA-ET intercalated paste process.

Figure 6B:
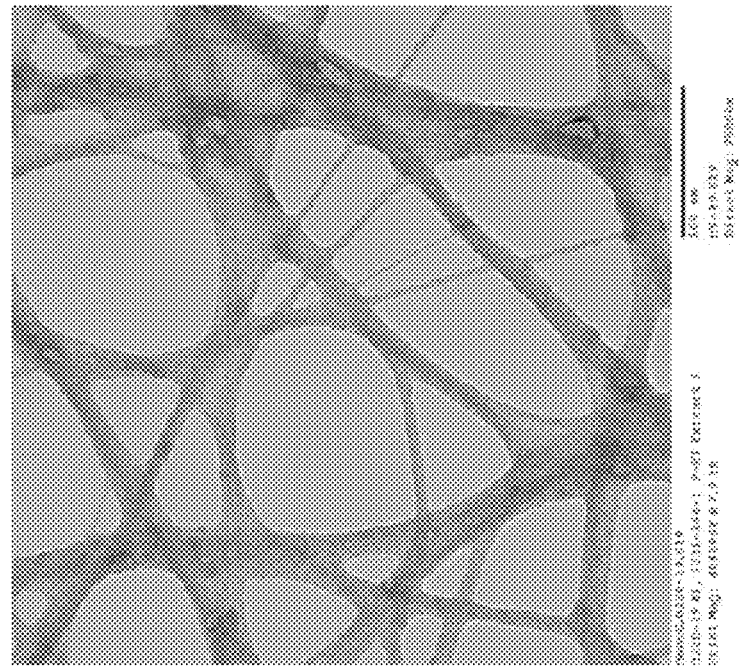
FIG. 6B is a photomicrograph image using a transmission electron microscope (TEM) of carbon species in final ink using a process in accordance with one aspect of the invention.
Figure 6A:
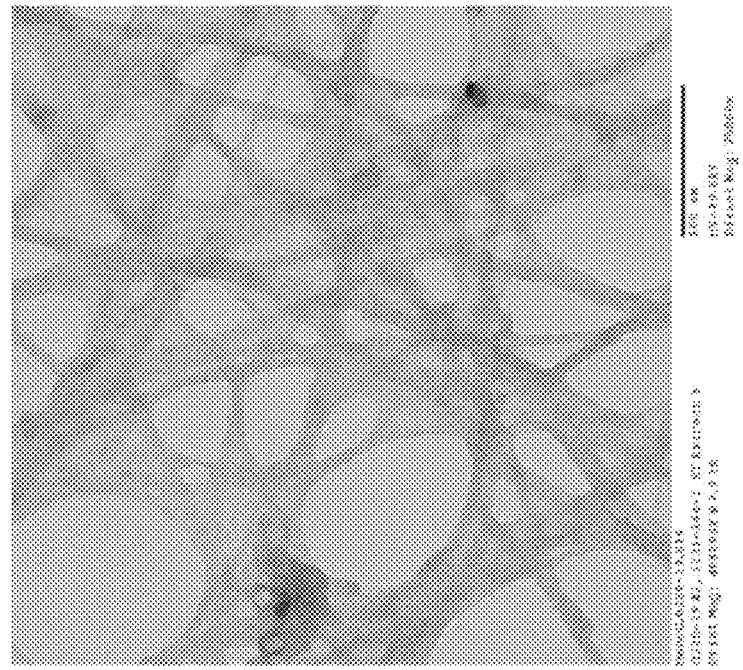
FIG. 6A is a photomicrograph image using a transmission electron microscope (TEM) of carbon species in final ink using a control process.

FIG. 6A and FIG. 6B are photomicrograph images using a transmission electron microscope (TEM) of carbon species in final ink using a control process (FIG. 6A—ET Process) compared to final ink prepared in accordance with one aspect of the invention (FIG. 6B—PA-ET Process).

Figure 7B:
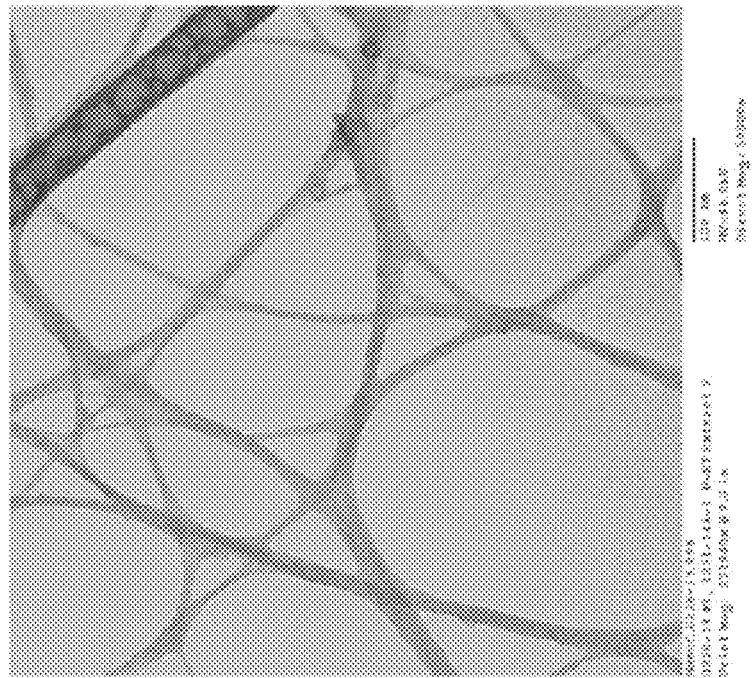
FIG. 7B is a photomicrograph image using a transmission electron microscope (TEM) of carbon species in final ink using a process in accordance with one aspect of the invention.
Figure 7A:
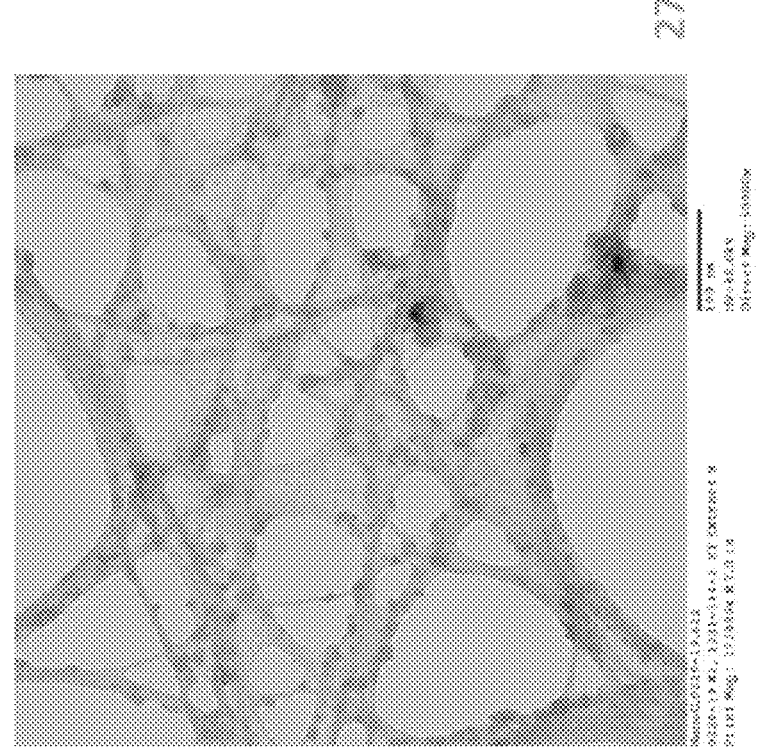
FIG. 7A is a photomicrograph image using a transmission electron microscope (TEM) of carbon species in final ink using a control process.

FIG. 7A and FIG. 7B are photomicrograph images using a transmission electron microscope (TEM) of carbon species in final ink using a control process (FIG. 7A—ET Process) compared to final ink prepared in accordance with one aspect of the invention (FIG. 7B—PA-ET Process) at a different magnification. The TEM images from FIG. 6 and FIG. 7 provide a direct comparison between carbon species present in the final carbon nanotube ink. TEM samples were analogously prepared dispersed in isopropanol/water and bath sonicated for 5 minutes, where a single drop of ink was then cast onto a TEM grid immobilized on a glass slide on a hotplate preheated to 200° C. The solvent evaporated immediately leaving the carbon nanotube sample immobilized on the grid ready for imaging. Various types of defects can be seen in the control ET Process image, including "webbing" (presumed to be 'nontubular carbon') and carbon-encapsulated catalyst particles as seen in FIG. 7A. From an overall review of the images, defects are present in the control ET Process, and largely absent in the new process (PA-ET Process).

Figure 8:
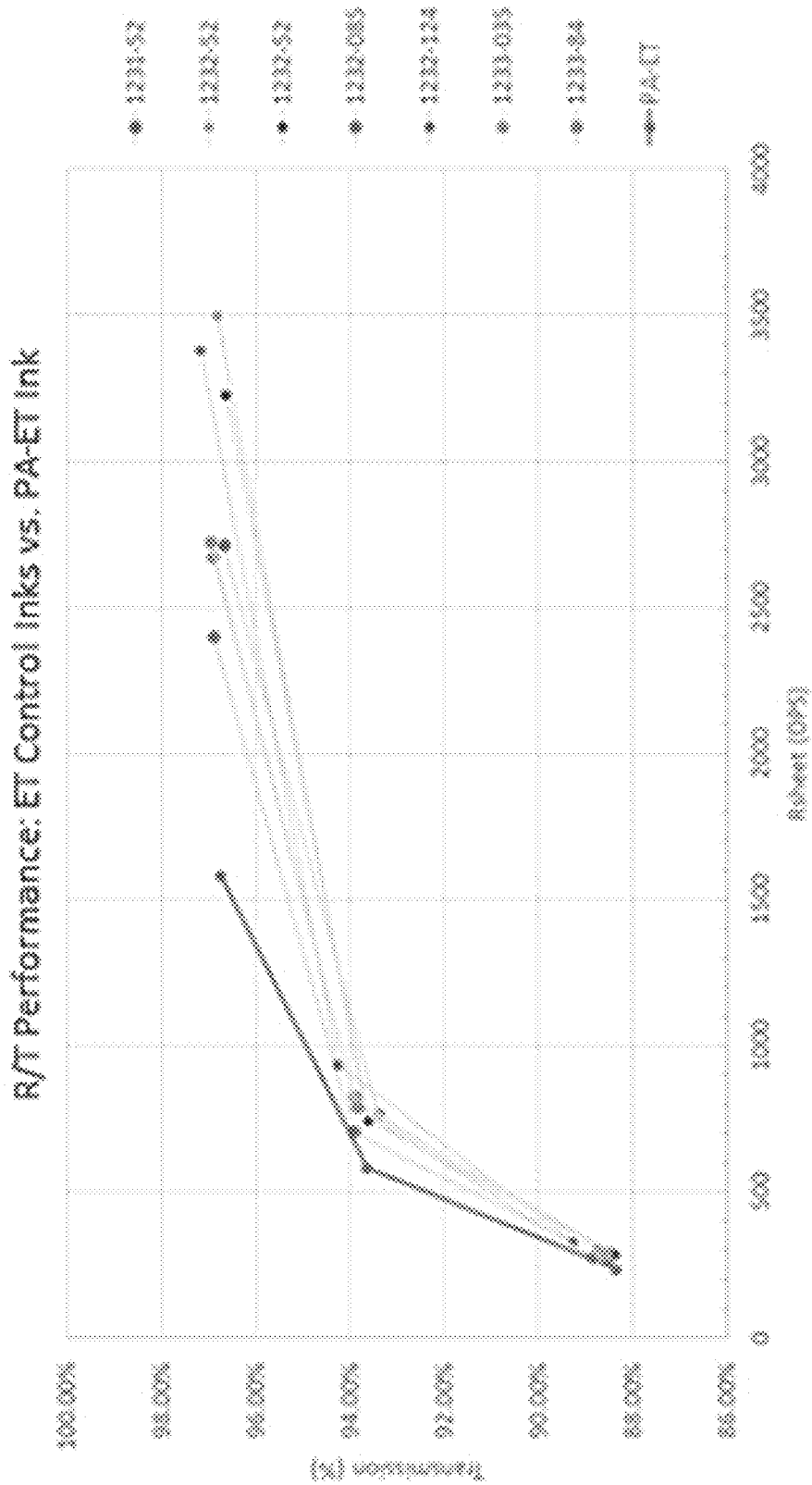
FIG. 8 is a graph illustrating comparative transmittance and sheet resistance data for transparent conductive films produced in accordance with an embodiment of the present invention and a control process.

FIG. 8 is a graph illustrating comparative transmittance and sheet resistance data for transparent conductive films produced in accordance with an embodiment of the present invention (PA-ET Process) and a control process (ET Process). The process described herein provides superior performance as indicated by the shift toward higher transparency and lower resistivity (resistance/transmission, "R/T curve"). Carbon nanotube ink of each type was sprayed onto a corona-treated polyether terephthalate (PET) substrate using a Sonotek ultrasonic spray nozzle in three different ink volumes per sample such that a discrete set of three (3) sheet resistance/transmission points (and upon solvent evaporation, three data points of resulting films) were measured and used to evaluate the performance of each ink. Films produced with inks containing a greater portion of impurities (particularly "nontubular carbon") will suffer depressed transparency and higher resistivity compared to films made with more pure carbon nanotubes and is therefore indicative of sample purity.

Figure 9:
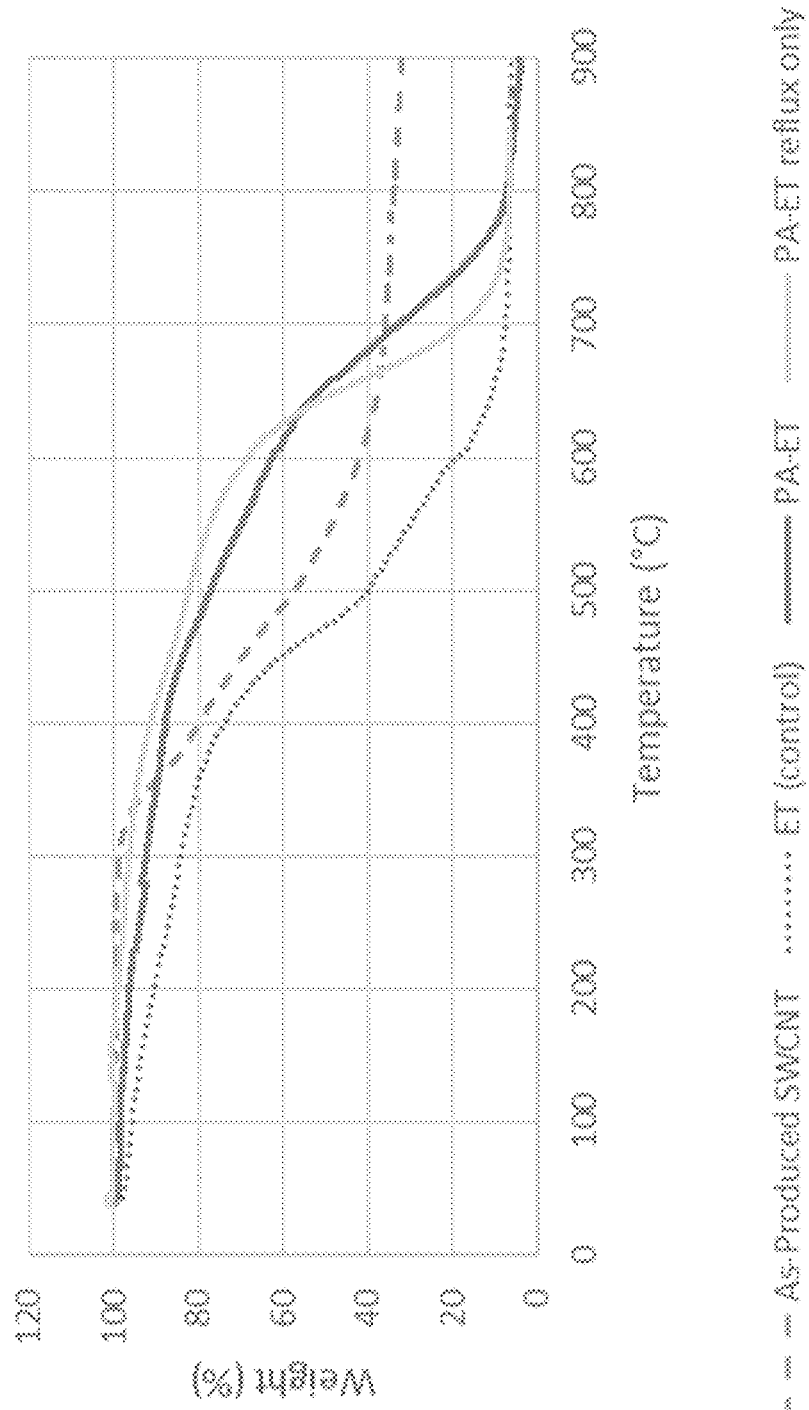
FIG. 9 is a thermogravimetric analysis (TGA) graph comparing ink precursor pastes produced in accordance with different treatment processes.
Figure 10:
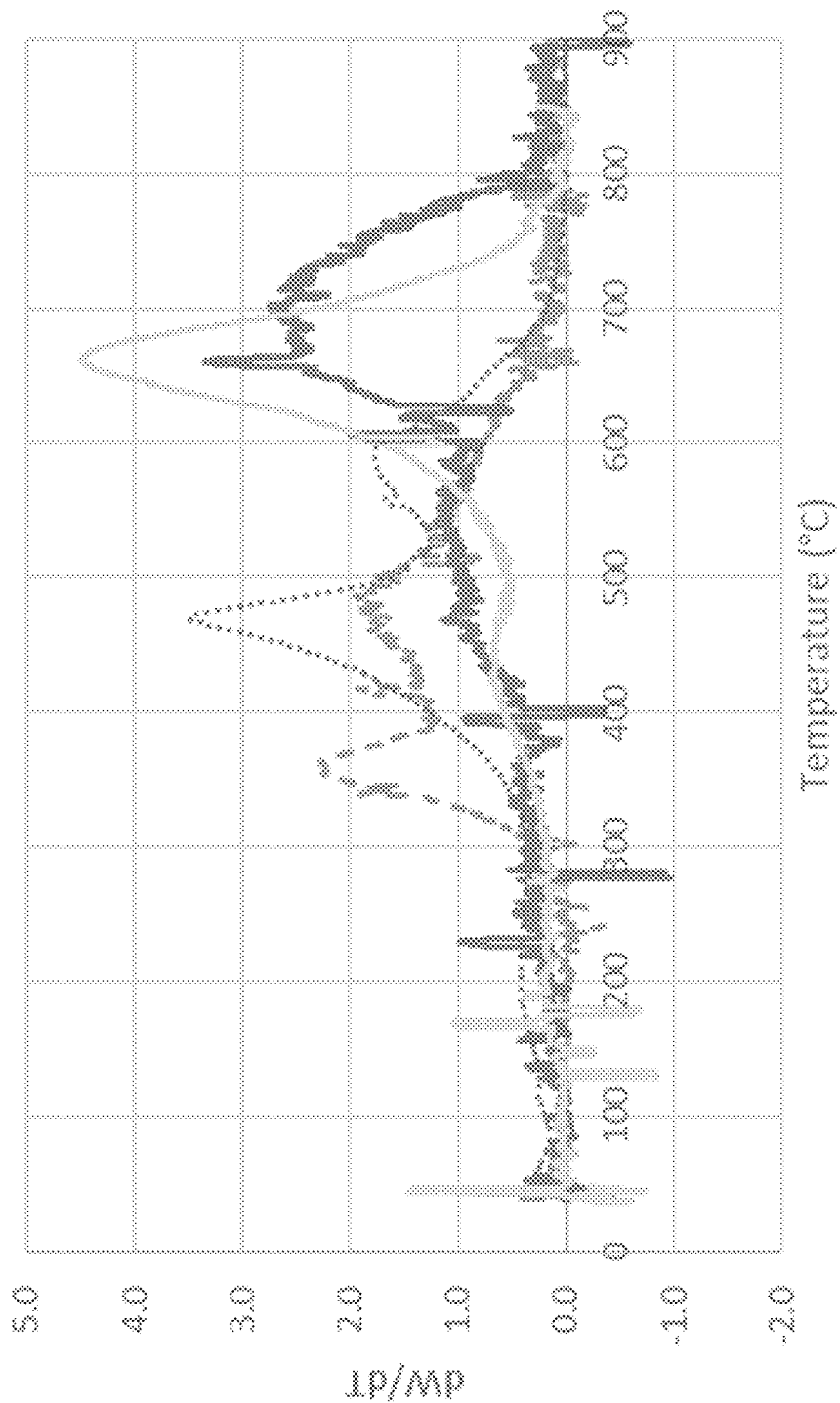
FIG. 10 is a thermal graph showing rate of weight change comparing ink precursor pastes produced in accordance with different treatment processes.

FIG. 9 and FIG. 10 are thermogravimetric analysis (TGA) graphs comparing ink precursor pastes produced using different processes. The PA-ET "reflux only" material was prepared by subjecting 4 g of the as-produced carbon nanotubes directly to a flat bottom flask to which was added 235 mL 85% phosphoric acid and 65 mL 6N nitric acid. The mixture was refluxed for 12 hours on a bare hotplate set at 425° C. The reaction mixture was cooled to room temperature, and the resulting slurry was rinsed to pH neutral and probe sonicated. The residual paste was dried and analyzed by TGA. These plots evidence both the criticality and performance benefits of using phosphoric acid in place of sulfuric acid, which extend beyond the exclusion of sulfur. In FIG. 9, the dotted line shows the control sulfuric "ET process," where there is significant oxidation shown as weight loss between 100 and 400° C., which by the low oxidation temperature are predominantly non-nanotube carbon impurities. Merely switching the sulfuric acid for phosphoric acid in the same acid reflux, the weight residue at around 400° C. is significantly higher (about 90% remaining for PA-ET reflux only vs. about 75% for control ET). Likewise, at 600° C., the residue of the control ET material is only 20% remaining, while the PA-ET reflux only material still has about 70% residue remaining, indicating a significantly higher percentage of purer carbon nanotubes. To extend this process and to demonstrate the effectiveness of the entire scope of this disclosure to include the phosphoric acid pretreatment "PA-ET" process, it is notable that additional benefit of pretreatment extends the oxidation process to 50° C. higher temperature than the PA-ET "reflux only" control.

Figure 11:
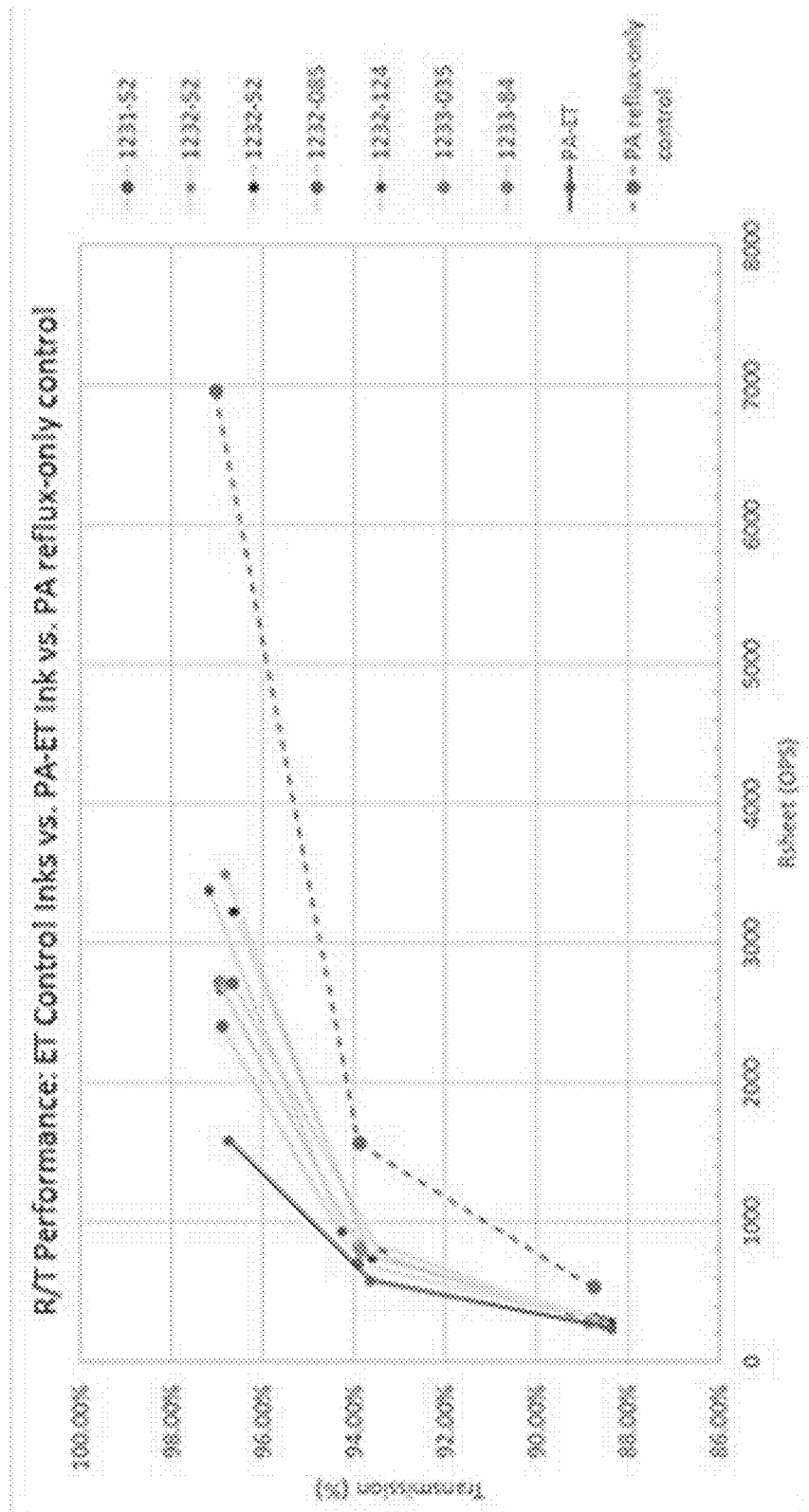
FIG. 11 is a graph illustrating comparative transmittance and sheet resistance data for transparent conductive films produced in accordance with different treatment processes.

FIG. 11 is a graph illustrating comparative transmittance and sheet resistance data for transparent conductive films produced in accordance with different pretreatment processes. The highest-performing material (highest transmission/lowest sheet resistance) in the group is the "PA-ET" process, which utilizes the phosphoric acid pretreatment followed by the blend of phosphoric acid and nitric acid for the oxidation treatment. In the control, non-pretreatment process "PA-ET Reflux Only" the carbon nanotubes were treated by refluxing in a blend of phosphoric acid and nitric acid and there was no prior acid pretreatment. In accordance with the third process (ET Process; as indicated by numerical identifiers in FIG. 11) a blend of sulfuric acid and nitric acid was used for the oxidation treatment. This comparison highlights the performance benefit of the phosphoric acid pretreatment step, where films produced with the PA-ET ink significantly outperformed films prepared with the PA-ET reflux only control, which utilized no pretreatment step. While the PA-ET Reflux Only control performs worse than the ink prepared with the PA-ET and control ET processes, reflux-only phosphoric acid process could still be advantageous in view of the significantly higher peak burn rate temperature, which indicates less damage than the analogous sulfuric acid process and TGA result, as well as to produce purified carbon nanotube material in the absence of a sulfur-containing reagent.

Figure 12:
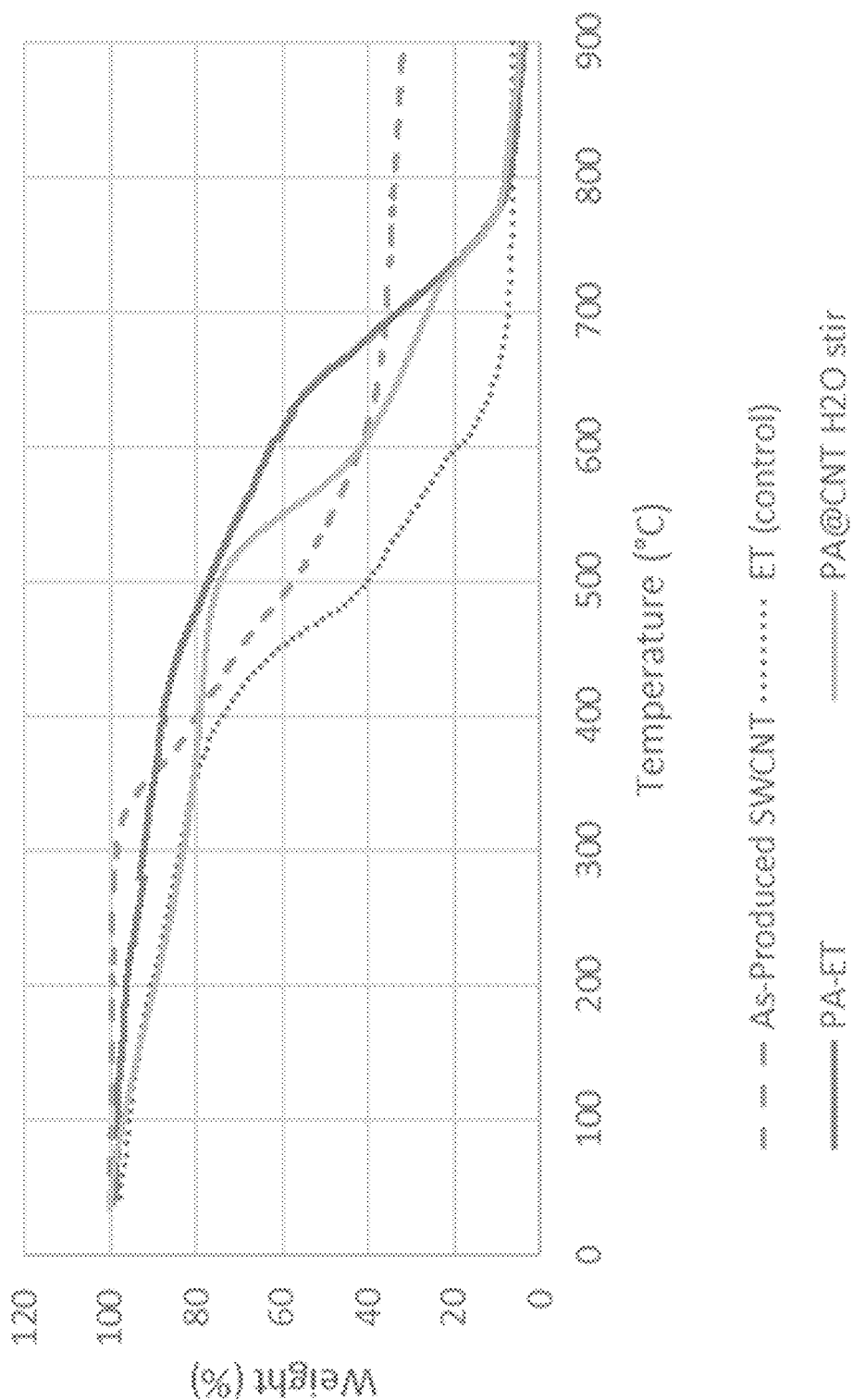
FIG. 12 is a thermogravimetric analysis (TGA) graph comparing ink precursor pastes produced in accordance with different treatment processes.
Figure 13:
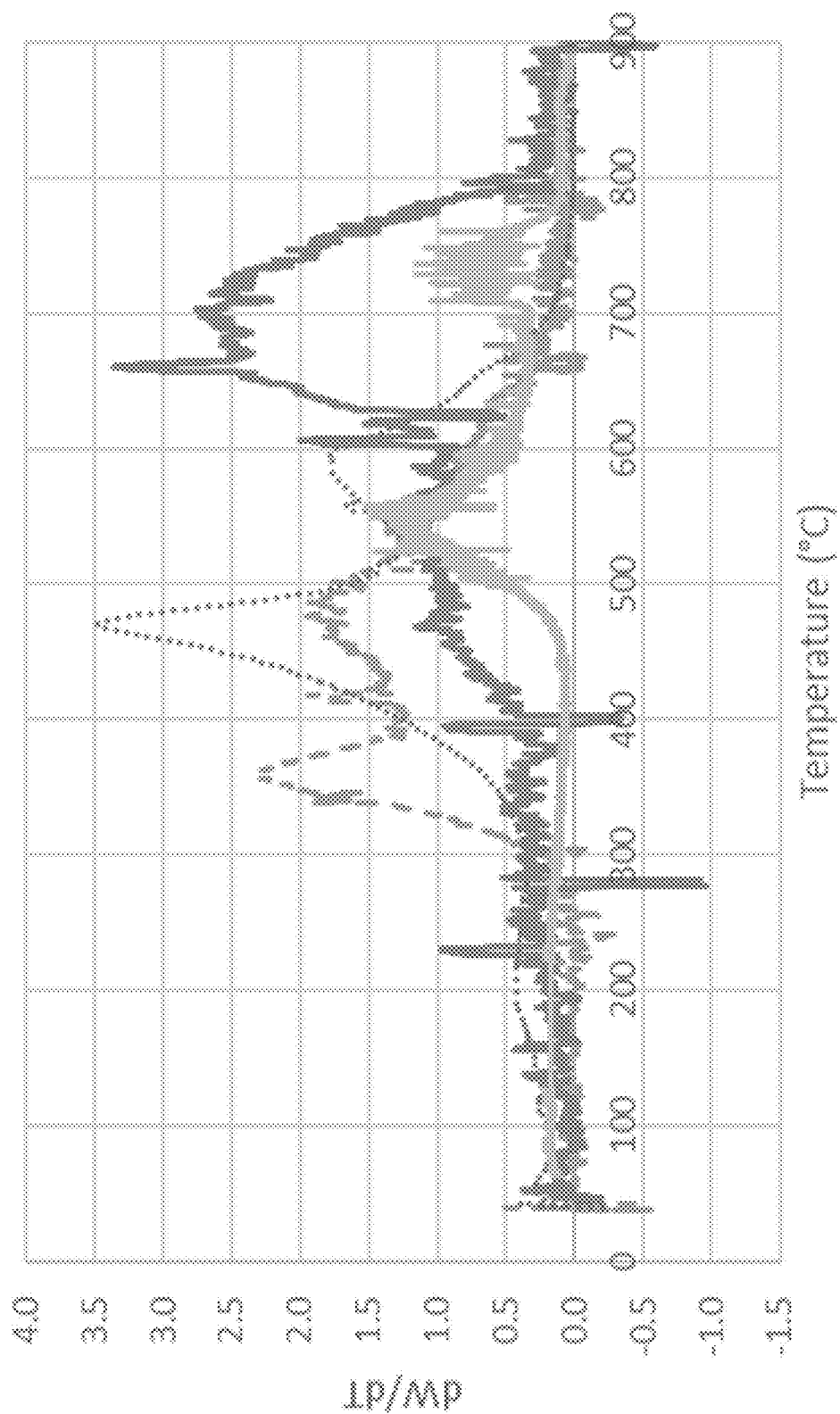
FIG. 13 is a thermal graph showing rate of weight change comparing ink precursor pastes produced in accordance with different treatment processes.

FIG. 12 and FIG. 13 are thermogravimetric analysis (TGA) graphs comparing ink precursor pastes produced in accordance with different pretreatment processes. Two of the processes are the same as those described above with respect to the PA-ET Process and the ET Process. A third process is described as "PA@CNT H$_2$O stir" where the carbon nanotubes are subjected to phosphoric acid pretreatment and then the carbon nanotube paste is allowed to intercalate for approximately 25 hours at 140° C. oil bath setpoint temperature. The intercalated paste is then transferred to a glass bottle with stirbar with about 125 mL DI water and stirred for 3 days at 60° C., during which time the CNT-water thickens substantially. A portion of the carbon nanotube slurry is was then dried under vacuum and TGA was taken. The paste could at this point be filtered and rinsed.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above and is limited only by the claims which follow.

What is claimed is:

1. A method of processing carbon nanotubes, comprising:
providing a carbon nanotube composition comprising carbon nanotubes and impurities;
contacting said carbon nanotube composition with a pretreatment agent to provide a pretreated composition and residual pretreatment agent, wherein the pretreatment agent is selected from the group consisting of phosphoric acid, methanesulfonic acid, ethanesulfonic acid, 1-propanesulfonic acid, dichloroacetic acid, ammonium sulfate, lithium sulfate, sodium sulfate, potassium sulfate, metal chloride salts, lithium chloride, potassium chloride, sodium chloride, rubidium chloride, cesium chloride, iron chloride, aluminum chloride, copper chloride, nickel chloride, potassium phosphate and combinations thereof;
drying the pretreated composition and residual pretreatment agent to a water content of less than 10%; and
subsequently contacting said pretreated composition with an oxidizing agent to provide a composition comprising oxidized carbon nanotubes.

2. The method of claim 1, wherein the carbon nanotubes comprise single-walled carbon nanotubes.

3. The method of claim 1, wherein the carbon nanotubes comprise multi-walled carbon nanotubes.

4. The method of claim 1, wherein the pretreatment agent comprises phosphoric acid.

5. The method of claim 4, where the phosphoric acid has a concentration of between about 0.01M and 10.9 M.

6. The method of claim 1, wherein the oxidizing agent is selected from the group consisting of nitric acid, potassium permanganate, chromium trioxide, hydrogen peroxide, potassium chlorate, sodium nitrate, perchloric acid and combinations thereof.

7. The method of claim 6, wherein the oxidizing agent comprises nitric acid.

8. The method of claim 1, wherein the carbon nanotube composition is contacted with the pretreatment agent at a weight ratio from about 10:1 to about 80:1 pretreatment agent to carbon nanotubes.

9. The method of claim 1, further comprising heating the composition comprising pretreated carbon nanotubes at a temperature from about 80° C. to 200° C.

10. The method of claim 1, further comprising heating the pretreated composition at a temperature from about 30° C. to about 170° C. prior to contacting with the oxidizing agent.

11. The method of claim 1, further comprising removing at least some of the impurities from the nanotube composition to provide purified carbon nanotubes.

12. The method of claim 1, wherein the impurities are selected from the group consisting of transition metal catalysts, graphitic carbons, amorphous carbon nanoparticles, fullerenes, carbon anions, polycyclic aromatic hydrocarbons, and mixtures thereof.

13. The method of claim 1, where the pretreatment agent comprises phosphoric acid and the oxidizing agent comprises nitric acid.

14. The method of claim 1, further comprising contacting said pretreated composition with additional pretreatment agent.

15. A method of processing carbon nanotubes, comprising:
providing a carbon nanotube composition comprising carbon nanotubes and impurities;
contacting said carbon nanotube composition with phosphoric acid to pretreat said carbon nanotubes to form a carbon nanotube-pretreatment agent mixed paste; and
subsequently contacting said carbon nanotube-pretreatment agent mixed paste with an acid composition, wherein said acid composition comprises phosphoric acid and nitric acid, thereby causing an increase in the separation distance between the carbon nanotubes.

16. A method of processing carbon nanotubes, comprising:
providing a carbon nanotube composition comprising carbon nanotubes and impurities;
contacting said carbon nanotube composition with a pretreatment agent to provide a carbon nanotube-pretreatment agent mixed paste, wherein the pretreatment agent is selected from the group consisting of phosphoric acid, methanesulfonic acid, ethanesulfonic acid, 1-propanesulfonic acid, dichloroacetic acid, ammonium sulfate, lithium sulfate, sodium sulfate, potassium sulfate, metal chloride salts, lithium chloride, potassium chloride, sodium chloride, rubidium chloride, cesium chloride, iron chloride, aluminum chloride, copper chloride, nickel chloride, potassium phosphate and combinations thereof; and
subsequently combining said carbon nanotube pretreatment agent mixed paste with an exfoliating fluid to form a mixture.

17. The method of claim 16, wherein the exfoliating fluid is selected from the group consisting of water, dimethylformamide, dimethylacetamide, n-methyl pyrrolidone, dimethyl sulfoxide, acetonitrile, tetrahydrofuran, cyclohexanol, butanol, ethanol, methanol, isopropanol, ethylene glycol, propylene glycol, propylene glycol methyl ether, cyrene, methyl lactate, glycerin, and mixtures thereof.

18. A method of processing carbon nanotubes, comprising:
providing a carbon nanotube composition comprising carbon nanotubes, and impurities;
contacting said carbon nanotube composition with a combination of phosphoric acid and nitric acid to provide a carbon nanotube-pretreatment agent mixed paste comprising oxidized carbon nanotubes; and combining the carbon nanotube-pretreatment agent mixed paste comprising oxidized carbon nanotubes with a silver ink.

\* \* \* \* \*